United States Patent
Bhattacharya et al.

(10) Patent No.: US 9,731,480 B2
(45) Date of Patent: Aug. 15, 2017

(54) PRINTED POLYESTER FILM BASED LAMINATE, METHOD OF MAKING AND APPLICATION THEREOF

(75) Inventors: Satya Prasad Bhattacharya, Mumbai (IN); Mrinal Kanti Banerjee, Mumbai (IN)

(73) Assignee: Essel Propack Limited, Mumbai (IN)

( * ) Notice: Subject to any disclaimer, the term of this patent is extended or adjusted under 35 U.S.C. 154(b) by 192 days.

(21) Appl. No.: 14/125,793

(22) PCT Filed: Jun. 14, 2012

(86) PCT No.: PCT/IN2012/000420
§ 371 (c)(1),
(2), (4) Date: Dec. 12, 2013

(87) PCT Pub. No.: WO2013/051017
PCT Pub. Date: Apr. 11, 2013

(65) Prior Publication Data
US 2015/0183192 A1    Jul. 2, 2015

(30) Foreign Application Priority Data
Jun. 14, 2011   (IN) .......................... 1731/MUM/2011

(51) Int. Cl.
*B32B 1/08* (2006.01)
*B32B 7/12* (2006.01)
(Continued)

(52) U.S. Cl.
CPC ............... *B32B 27/08* (2013.01); *B32B 1/08* (2013.01); *B32B 27/32* (2013.01); *B32B 27/36* (2013.01); *B32B 38/145* (2013.01); *B05D 1/265* (2013.01); *B05D 2201/02* (2013.01); *B32B 7/12* (2013.01); *B32B 27/28* (2013.01); *B32B 37/12* (2013.01); *B32B 37/153* (2013.01);
(Continued)

(58) Field of Classification Search
None
See application file for complete search history.

(56) References Cited

U.S. PATENT DOCUMENTS 3,925,591 A * 12/1975 Breitenfellner ......... B32B 27/00
156/244.14
4,327,136 A * 4/1982 Thompson .............. B32B 27/08
206/557
(Continued)

FOREIGN PATENT DOCUMENTS

EP    1253009 A2    10/2002
EP    1253009 A3    11/2002
(Continued)

OTHER PUBLICATIONS

International Search Report on Patentability for PCT/IN2012/0004020 dated Apr. 23, 2013.

*Primary Examiner* — Vivian Chen
(74) *Attorney, Agent, or Firm* — Baker & Hostetler LLP

(57) ABSTRACT

The present disclosure provides a polyester film based laminate comprising: an outer polyethylene layer; a core layer of a printed polyester film; and an inner polyethylene layer; an article made of said laminate. The printing on the said polyester film based laminate can be a reverse printing. The present disclosure further provides a method for producing a polyester film based laminate.

11 Claims, 3 Drawing Sheets

(51) Int. Cl.

| | | |
|---|---|---|
| *B32B 27/28* | (2006.01) | |
| *B32B 27/32* | (2006.01) | |
| *B32B 27/36* | (2006.01) | |
| *B32B 37/15* | (2006.01) | |
| *B32B 37/12* | (2006.01) | |
| *C08L 23/06* | (2006.01) | |
| *C08G 73/02* | (2006.01) | |
| *B05D 1/26* | (2006.01) | |
| *C09J 179/02* | (2006.01) | |
| *C09J 183/00* | (2006.01) | |
| *C09D 11/02* | (2014.01) | |
| *C09D 11/10* | (2014.01) | |
| *C09D 11/102* | (2014.01) | |
| *B32B 27/08* | (2006.01) | |
| *B32B 38/00* | (2006.01) | |
| *C09D 175/04* | (2006.01) | |

(52) U.S. Cl.
CPC ....... *B32B 2250/05* (2013.01); *B32B 2250/24* (2013.01); *B32B 2250/40* (2013.01); *B32B 2255/10* (2013.01); *B32B 2255/26* (2013.01); *B32B 2270/00* (2013.01); *B32B 2307/4023* (2013.01); *B32B 2307/75* (2013.01); *B32B 2323/046* (2013.01); *B32B 2367/00* (2013.01); *B32B 2379/08* (2013.01); *C08G 73/0206* (2013.01); *C08L 23/06* (2013.01); *C09D 11/02* (2013.01); *C09D 11/10* (2013.01); *C09D 11/102* (2013.01); *C09D 175/04* (2013.01); *C09J 179/02* (2013.01); *C09J 183/00* (2013.01); *Y10T 428/1334* (2015.01); *Y10T 428/1352* (2015.01); *Y10T 428/1393* (2015.01); *Y10T 428/24851* (2015.01); *Y10T 428/24901* (2015.01); *Y10T 428/24959* (2015.01); *Y10T 428/24967* (2015.01); *Y10T 428/31786* (2015.04); *Y10T 428/31797* (2015.04); *Y10T 428/31913* (2015.04); *Y10T 428/31938* (2015.04)

(56) References Cited

U.S. PATENT DOCUMENTS

| | | | | |
|---|---|---|---|---|
| 4,343,851 A | * | 8/1982 | Sheptak | B32B 27/08 264/288.4 |
| 4,387,126 A | * | 6/1983 | Rebholz | B32B 15/08 229/5.82 |
| 4,687,688 A | * | 8/1987 | Curie | B32B 27/08 264/210.5 |
| 4,939,035 A | | 7/1990 | Swofford | |
| 5,100,717 A | * | 3/1992 | Nedzu | B29C 45/14311 264/129 |
| 5,156,904 A | * | 10/1992 | Rice | B29C 55/026 264/175 |
| 5,338,785 A | * | 8/1994 | Catena | C08L 77/08 524/39 |
| 5,427,235 A | * | 6/1995 | Powell | B65D 85/1018 206/245 |
| 5,478,645 A | * | 12/1995 | Chang | B32B 27/08 428/347 |
| 5,614,318 A | * | 3/1997 | Hayashi | C09D 179/02 428/343 |
| 5,830,545 A | * | 11/1998 | Frisk | B32B 27/32 383/113 |
| 5,858,524 A | * | 1/1999 | Bafford | B32B 7/12 428/195.1 |
| 5,942,320 A | | 8/1999 | Miyake | |
| 5,948,546 A | * | 9/1999 | Bafford | B32B 27/30 156/326 |
| 6,110,599 A | * | 8/2000 | Edwards | C09D 123/0815 428/461 |
| 6,221,545 B1 | * | 4/2001 | Tran | B32B 7/12 283/81 |
| 6,896,745 B2 | * | 5/2005 | Arai | B82Y 25/00 148/302 |
| 6,896,754 B2 | | 5/2005 | Yamaguchi | |
| 6,916,516 B1 | | 7/2005 | Gerber et al. | |
| 9,486,987 B2 | * | 11/2016 | Banerjee | B32B 27/32 |
| 2002/0157773 A1 | | 10/2002 | Nobuyuki et al. | |
| 2004/0013890 A1 | | 1/2004 | Kovalchuk et al. | |
| 2004/0097684 A1 | * | 5/2004 | Bruchmann | C08G 18/3206 528/44 |
| 2004/0119804 A1 | * | 6/2004 | Emslander | B41M 5/52 347/105 |
| 2004/0173944 A1 | | 9/2004 | Mueller et al. | |
| 2005/0069660 A1 | | 3/2005 | Climenhage | |
| 2005/0147834 A1 | * | 7/2005 | Bruchmann | B32B 27/00 428/458 |
| 2005/0238900 A1 | * | 10/2005 | Kiehne | B32B 27/36 428/480 |
| 2006/0083875 A1 | * | 4/2006 | Weaver | B32B 7/12 428/35.2 |
| 2006/0280959 A1 | * | 12/2006 | Kumano | B29C 55/005 428/480 |
| 2007/0134470 A1 | * | 6/2007 | Jesberger | B32B 27/20 428/141 |
| 2007/0260016 A1 | * | 11/2007 | Best | B32B 27/32 525/240 |
| 2010/0266828 A1 | * | 10/2010 | Banerjee | B32B 27/08 428/220 |
| 2010/0273377 A1 | * | 10/2010 | Files | B32B 27/32 442/49 |
| 2010/0279041 A1 | | 11/2010 | Mathew et al. | |

FOREIGN PATENT DOCUMENTS

| | | |
|---|---|---|
| EP | 1253009 B1 | 7/2004 |
| WO | WO 00/46122 A * | 8/2000 |
| WO | WO 2013/051017 A2 | 4/2013 |

* cited by examiner

PRINTED POLYESTER FILM BASED LAMINATE, METHOD OF MAKING AND APPLICATION THEREOF

CROSS-REFERENCE TO RELATED APPLICATION

This application is filed under the provisions of 35 U.S.C. §371 and claims priority to International Patent Application No. PCT/IN2012/000420, filed on Jun. 14, 2012, which, in turn, claims priority to the Priority Patent Application No. 1731/MUM/2011, filed on Jun. 14, 2011. Both applications are incorporated herein in their entirety.

TECHNICAL FIELD

The present disclosure relates, in general, to polyester film based laminate and, in particular, to printed polyester film based laminate, and an article made of such laminate. The present disclosure also relates to a process for preparation of such laminate.

BACKGROUND

Conventionally laminates are used in large quantities for the packaging and dispensing of various products, such as cosmetics and food products. The laminates are usually made of plastic polymers films because of the inherent properties, such as physical properties of strength, light weight, durability, non-toxicity, resistance to light and heat, and inertness towards chemicals. Such properties make laminates an appropriate choice for application in packaging industry.

EP 1985442 discloses a laminated film containing a polyester or polyamide layer having a heat resistant outer layer printed by Gravure printing.

US Patent application 2002/0157773 discloses a method of producing a laminated packaging material with a base film thereof printed by Gravure printing.

U.S. Pat. No. 6,041,929 discloses a film bag with hidden indicia formed in the film bag laminate, which is not viewed from outside the package.

EP 1879751 discloses a heat sealable laminate and a method for producing a labeled packaging material.

The materials used for manufacturing films and thus the laminates, which are subsequently used in the packaging industry are important since they dictate the properties of end products, such as tubes. Thus, usage of inferior materials may hamper the quality of the end products. Recently, simulation and duplication of genuine products has been a major concern, since local laminate manufactures often ride on goodwill of established laminate manufacturers to produce counterfeited products. The material used to manufacture the counterfeited products may not have properties required for a particular end use, for example, the materials used for manufacturing counterfeited containers for hair dyes may not resilient chemicals in the hair due, which may decrease the shelf life of the hair dyes.

SUMMARY

The present disclosure relates to a polyester film based laminate comprising: an outer polyethylene layer; a core layer of a printed polyester film; and an inner polyethylene layer.

The present disclosure also relates to a polyester film based laminate comprising: an outer polyethylene layer of 70:30 to 30:70 of a low density polyethylene (LDPE) and a linear low density polyethylene (LLDPE); a core layer of a printed polyester film of polyethylene terephthalate (PET); and an inner polyethylene layer of 70:30 to 30:70 of a low density polyethylene (LDPE) and a linear low density polyethylene (LLDPE). The printing on said polyester film based laminate is a reverse printing technique.

The present disclosure further relates to tubes or lamitube made of the printed polyester film based laminate.

The present disclosure also provides a method for producing a polyester film based laminate. The present disclosure also provides a producing system for producing a polyester film based laminate.

These and other features, aspects, and advantages of the present subject matter will become better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The above and other features, aspects, and advantages of the subject matter will be better understood with regard to the following description, appended claims, and accompanying drawings where:

DETAILED DESCRIPTION

Figure 1:
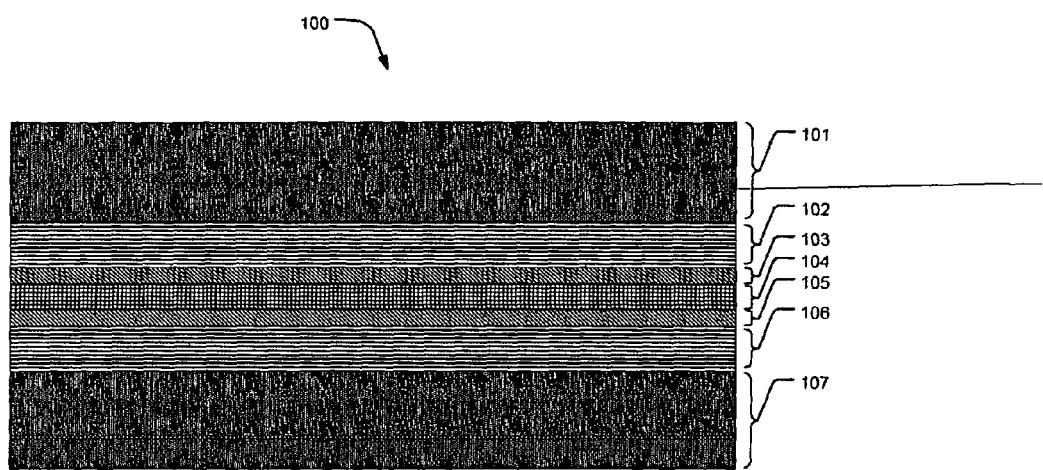
FIG. 1 illustrates an exemplary structure of the polyester film based laminate, according to an embodiment of the present subject matter.

The present disclosure provides a polyester film based laminate comprising: an outer polyethylene layer; a core layer of a printed polyester film; and an inner polyethylene layer. In a specific embodiment, the polyester film is a polyethylene terephthalate (PET) film.

The printed core polyester film layer, in accordance with the present disclosure, is printed by reverse printing technique. The reverse printing technique of the polyester film is by Gravure printing technique or a surface printing technique. The surface printing of the polyester film is achieved by any surface printing technology known in the art, including Holographic printing (for printing of holograms), letter press printing and Flexography printing. The printing can be authentication marks, any text, designs, trademarks, logos etc.

In one aspect, an embodiment of the present disclosure provides the polyester film based laminate comprising: an outer polyethylene layer of 70:30 to 30:70 of a low density polyethylene (LDPE) and a linear low density polyethylene (LLDPE); a core layer of a printed polyester film of polyethylene terephthalate (PET); and an inner polyethylene layer of 70:30 to 30:70 of a low density polyethylene (LDPE) and a linear low density polyethylene (LLDPE).

The linear low density polyethylene (LLDPE) in accordance with the present disclosure can have density around 0.912 g/cc to 0.940 g/cc, preferably 0.927 glee. Low density polyethylene (LDPE) and linear low density polyethylene (LLDPE) used may be Metallocene linear low density polyethylene (LLDPE) or linear low density polyethylene (LLDPE) formed using other catalyst such as Ziegler-Natta. The low density polyethylene (LDPE) in accordance with the present disclosure can have density around 0.918 g/cc to 0.935 g/cc, preferably 0.933 g/cc.

In an embodiment, the core layer of the printed polyester film is chemically coated, preferably silane coated. This chemical coating on the polyester film facilitates better ink adhesion and makes it suitable for extrusion lamination on to the printed surface without any loss on adhesion.

The polyester film based laminate of the present disclosure can also comprise of primer layers which can bond the polar polyester group to the non-polar polyethylene group. Primer is a preparatory coating put on the laminates before coating to ensures better adhesion of paint to the surface, increases paint durability, and provides additional protection of the laminate being painted. Accordingly, another embodiment of the present disclosure provides a polyester film based laminate comprising: an outer polyethylene layer; a polyethylene extrusion layer; a first primer layer; a core layer of a printed polyester film; a second primer layer; a polyethylene extrusion layer; and an inner polyethylene layer.

The first primer layer and the second primer layers may be same or different. In one aspect, the first primer layer and the second primer layer are same. In another embodiment, the primer layers independently, comprises of polyethylene imines (PEI). In a preferred embodiment, the first primer layer and the second primer layer is both layers of a polyethylene imine. The primer layer when present in the laminate of the present disclosure, can be of thickness ranging from 0.1μ to 0.5μ.

Laminates are made of various layers of extruded plastic or polymer films bonded together either by fusing or by using an adhesive. Generally, the laminates are formed as three layers namely an outer layer, a middle layer, and an inner layer. Further, a tie layer or a primer layer and tie layer is provided between the outer layer and the middle layer and between the middle layer and the inner layer. The outer layer usually serves as the printing layer and is composed mainly of multilayered coextruded polyethylene film; the middle layer of the laminate is usually formed of aluminum foil or multilayered coextruded ethylene vinyl alcohol (EVOH), polyethylene terephthalate (PET), or polypropylene and serves as a barrier layer to atmospheric air and moisture. The inner layer of the laminate is mainly composed of multilayered coextruded polyethylene similar to the outer layer and serves as the sealant layer of lamitube or any other flexible laminate. When the laminate has been processed and formed into a storage container, the inner layer prevents contact between contents packaged in the storage container and the middle layer and also the migration of the packed product. The tie or the primer layer and tie layer between the different layers serves as an adhesive to bind the layers together and form the laminate.

Conventional laminates have a thickness ranging from about 250 microns (μ) to 300 microns (μ). The polyethylene present in the outer layer and the inner layer impart mechanical strength and stiffness to the laminate by virtue of the inherent polymer structures. Further, the material used for making the films and thus the laminates are chosen based on their physical properties, such as, strength, light weight, durability, non-toxicity, resistance to light and heat, and inertness towards chemicals.

Yet another embodiment of the present disclosure provides a polyester film based laminate comprising: an outer polyethylene layer of 70:30 to 30:70 of a low density polyethylene (LDPE) and a linear low density polyethylene (LLDPE) having a thickness of 175μ; a polyethylene extrusion layer of low density polyethylene (LDPE) having a thickness of 30μ; a primer layer of polyethylene imines (PEI) having a thickness of 0.1μ; a core layer of a printed polyester film of polyethylene terephthalate (PET) having a thickness of 12μ; a primer layer of polyethylene imines (PEI) having a thickness of 0.1μ; a polyethylene extrusion layer of low density polyethylene (LDPE) having a thickness of 30μ; and an inner polyethylene layer of 70:30 to 30:70 of a low density polyethylene (LDPE) and a linear low density polyethylene (LLDPE) having a thickness of 175μ.

The laminate of the present disclosure can be of thickness in the range of 350μ to 450μ preferably, from 400μ to 450μ.

The printing of the polyester film, in one aspect of the present disclosure is achieved by using gravure printing mechanism. Non limiting examples of the printing mark or authentication mark that can be printed on the polyester film include text, graphics, logo, and trademarks. Further, in an example, the font or size of the authentication mark may be chosen such that the authentication mark is not visible to naked eye thereby making it difficult for the malicious manufacturers to imitate the genuine goods. Additionally, since the authentication mark is not visible to naked eye, it does not affect or hamper the aesthetics of the end products. Upon printing of the authentication mark, extrusion lamination of the polymer film may be performed to provide a laminate. The laminate thus produced bears the authentication mark.

The printed polyester film based laminate can be made into various laminated articles for packaging and dispensing of various products. In an embodiment, the present disclosure provides an article made of the printed polyester film based laminate. Preferably, the article is a tube or a lamitube.

The present disclosure further provides a method for producing a polyester film based laminate comprising: receiving a polyester film; coating the polyester film with an adhesive chemical; printing a print mark on the chemical coated polyester film using a suitable ink; coating the polyester film with a primer on both sides; and performing extrusion lamination with the polyester film sandwiched between two polyethylene films, to obtain the polyester film based laminate.

The polyester film used in the process above is preferably a polyethylene terephthalate (PET) film. The said polyester film may be chemically coated, preferably silane coated.

In yet another embodiment, the printing of the polyester film is achieved by using surface printing selected from letterpress printing, flexography printing or hologram printing.

In still another embodiment, the ink used for the printing is vinyl ink having particle size of pigments less than 5 micron or Polyurethane ink (PU). The ink used for printing should have low viscosity, which allows the ink to be drawn into the engraved cells.

The primer used in the process of the present disclosure comprises of polyethylene imines (PEI), as described in one of the foregoing paragraphs in accordance with the present disclosure.

Apart from the core printed layer of the polyester film based laminate of the present disclosure, the outer polyethylene layer can also be printed by letterpress or flexography printing process. Accordingly, an aspect of the present disclosure provides a polyester film based laminate with a core layer of printed polyester film, wherein the outer polyethylene layer is printed.

In one of the embodiment, FIG. 1 illustrates an exemplary structure of the polyester film based laminate. The polyester film based laminate 100, according to FIG. 1, comprising: an outer polyethylene layer (101) of 70:30 to 30:70 of low density polyethylene (LDPE) and linear low density polyethylene (LLDPE) having of 175µ; a polyethylene extrusion layer (102) of low density polyethylene (LDPE) having a thickness of 30µ; a primer layer (103) of polyethylene imines (PEI) having a thickness of 0.1µ; a core layer (104) of a printed polyester film of polyethylene terephthalate (PET) having a thickness of 12µ; a primer layer (105) of polyethylene imines (PEI) having a thickness of 0.1µ; a polyethylene extrusion layer (106) of low density polyethylene having a thickness of 30µ; and an inner polyethylene layer (107) of 70:30 to 30:70 of low density polyethylene (LDPE) and linear low density polyethylene (LLDPE) having a thickness of 175µ.

The outer layer 101 serves as a printing layer, the inner layer 107 serves as a sealant layer, and the core layer 104 serves as a barrier layer.

Figure 2:
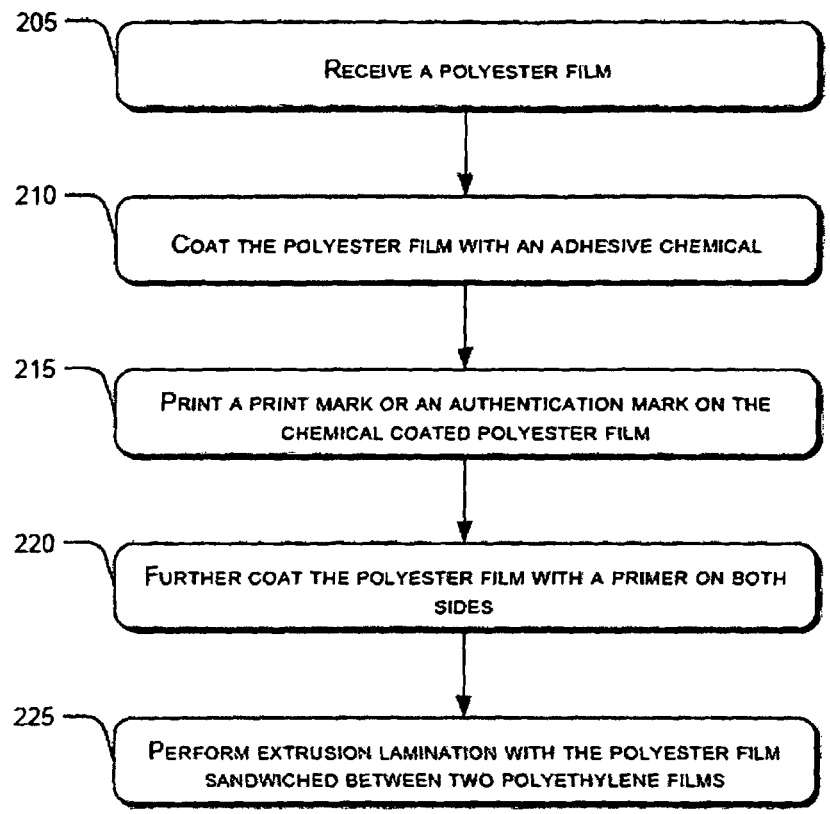
FIG. 2 illustrates a method for producing a polyester film based laminate with the authentication mark, according to an embodiment of the present subject matter.

In one of the embodiment FIG. 2 illustrates a method for producing a printed polyester film based laminate having with a printed mark or an authentication mark on the core polyester layer, according to an embodiment of the present disclosure.

At block 205, a polyester film, such as, the thick core layer 104 film is received. In one example, the polyester film is a polyethylene terephthalate (PET) film. In another example, the polyester film received in block 205 is a chemically coated film, such as silane coated to facilitate better adhesion of ink, as illustrated at block 210.

At block 215, a printing mark or an authentication mark is printed on the chemical coated polyester film. Examples of the authentication mark include but are not limited to text, logos, designs, graphics, images, signatures, and trademarks. In one implementation, the authentication marks is printed using gravure printing whether (reverse printing) or surface printing. In another implementation, the printing is a surface printing, such as Letter press printing, Flexography printing, or hologram printing. Further, in another implementation, the ink used for the printing is vinyl ink having particle size of pigments less than 5 micron or Polyurethane ink (PU).

At block, 220, the polyester film having the authentication mark is coated with a primer, which bonds the polar group of the polyester to the non polar group of the polyethylene that will form an outer and an inner layer. In an implementation, the primer is Polyethylene Imines coated on both the sides. The thickness of the primer layer is negligible as compared to the thickness of other layers in the laminate. Further, extrusion lamination of the polyester film is performed as illustrated at block 225. The extrusion lamination is performed such that the polyester film is sandwiched between two other polyethylene films to provide a laminate. The outer polyethylene film will serve as the printing layer and the inner layer will serve as the sealant layer. The laminate so produced bears the authentication mark, which helps in differentiating the genuine goods from the spurious ones.

In another embodiment, the outer polyethylene layer is printed by methods such as Letter press or flexography printing process.

Figure 3:
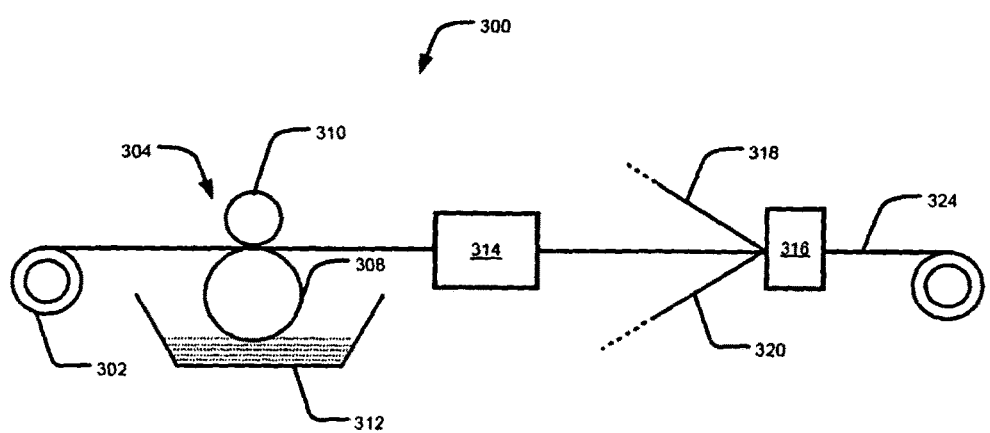
FIG. 3 illustrates a laminate production system for producing a polyester film based laminate having a polyester film with an authentication mark, according to an embodiment of the present subject matter.

In one aspect, FIG. 3 illustrates a laminate production system for producing a polyester film based laminate having a polyester film with an authentication mark, according to an embodiment of the present disclosure. In the production system 300, according to an embodiment of the present disclosure, a roll of polyester film (302) is fed through a conveyor (304) to a printing unit (306). In an example, the film (302) is a middle layer of a laminate, which is to be manufactured. Further, in one implementation, the polyester film (302) is a polyethylene terephthalate (PET) film. However, it will be understood that the other polyesters may also be used. Further, prior to printing, the polyester film (302) may be coated with a chemical, such as silane, to provide better ink adhesion on a surface of the polyester film. Such adhesive chemicals provide better anchorage between the polyester film (302) and ink used for printing. In another embodiment, the polyester film fed is a chemically coated polyester film, preferably, silane coated.

The conveyor (304) provides the polyester film (302) to the printing unit (306). In an example, the printing unit (306) is a gravure printing unit. The printing unit (306) includes a printing cylinder (308), an impression roller (310), an ink container (312), and a wiper blade (not shown in the figures). The printing cylinder (308) is usually composed of a metal, such as steel and copper, and has depressed or a sunken surface based on an authentication mark that is to be printed. The portion of the printing cylinder (308) having the matter to be printed include honey comb shaped cells or wells. The honey comb shaped cells or the wells are engraved on the printing cylinder (308). In one example, the engraving may be about 2 microns to 3 microns deep, based on the type of printing required. In one implementation, size of font used on the printing cylinder (308), i.e., on the size of the font on the engraved cells is about 2.5. It will be understood the size of font may vary from application to application. Since, the size of the font is reasonably small, the authentication mark is not visible to naked eye and becomes visible when viewed and inspected through a magnifying glass.

Further, the unetched portion of the printing cylinder (308) represents unprinted areas, which correspond to the area of the polyester film (302) on which no printing is desired. The printed cylinder (308) rotates in the ink container (312) containing ink required for printing of the authentication mark. The ink used for printing has low viscosity, which allows the ink to be drawn into the engraved cells. In one implementation, the ink used for printing is vinyl ink. Further, to print the fonts of 2.5 size with legible clarity, the ink has pigments with particle size of less than 5 micron.

The higher particle size of the pigments may lead to blocking of the surface of the polyester film (302). Moreover, ink adhesion when exposed to molten polymer films at high temperatures, for example, 350° C., becomes difficult to achieve. Therefore to provide better ink adhesion, the polyester film (302) is coated with adhesive chemical as mentioned above. Further, the ink may include solvent, such as, acidic acid. The solvent provides for quick drying of the ink.

The printing of the authentication mark on the printing cylinder is facilitated by the rotation of the printing cylinder (308) in the ink container (312). As the printing cylinder (308) turns ion the ink container (312), excess ink is wiped off from the printing cylinder (308) by a wiper blade, which may made of any metal. As a result, the ink remaining in the engraved cells is transferred on the polyester film (302) by way of the impression roller (310) to form the authentication mark. As the polyester film (302) passes through the printing unit (304), the impression roller (310) applies a stress upon the polyester sheet (302) such that the authentication mark from the printed cylinder (308) is impressed upon the polyester film (302). Accordingly, the authentication mark is reverse printed on the polyester film (302).

Upon printing of the authentication mark, the polyester film (302) is passed through one or more heaters (314), which provide for quick drying of the ink thereby preventing smearing or smudging of the authentication mark. It will be understood that the laminate production system (300) may comprise multiple printing units. Further, the printing unit (304) may be manually operated or may be automated.

Subsequently, in one implementation, the polyester film (302) is coated with a primer, that bonds polar polyester group to non polar groups. For example, the primer is polyethylene imines (PEI), coated on both sides of the polyester film. Once the primer is coated, the polyester film (302) is fed into a laminating mechanism (316) along with a first polyethylene film (318) and a second polyethylene film (320). In an implementation, the first polyethylene film (318) and the second polyethylene film (320) are formed of linear low-density polyethylene (LLDPE), such as metallocene linear low-density polyethylene (LLDPE), and low-density polyethylene (LDPE). In one example, the composition of the first polyethylene film (318) and the second polyethylene film (320) includes metallocene linear low-density polyethylene (LLDPE) and low-density polyethylene (LDPE) in a ratio of 70:30 to 30:70. In another example, the compositions of the two polyethylene films (318) and (320) can be different or the same.

In one embodiment, the printed and polyethylene.Imine coated PET, i.e., the polymer film (302) is extruded using extruder machine (316). In the extruder machine (316), the PET (302) and one layer of the first polyethylene film (318) is brought to the close proximity and the molten low density polyethylene (LDPE) extruded through hot die is put in between the PET (302) and the first Polyethylene film (318). It is pressed and cooled simultaneously thus facilitating to lamination. This assembly or entity is further brought to the close proximity to the second Polyethylene film (320) and again low density polyethylene (LDPE) is extruded between these two layers thus making the final laminate, (324).

Once the laminate (324) is created, the laminate (324) is slitted at the required length or width based on the end products, such as tubes. The slitted laminate portions may further be printed, for example, by Letter Press or Flexography process, followed by production of the end products.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

An outer polyethylene layer of 70:30 to 30:70 of low density polyethylene (LDPE) and linear low density polyethylene (LLDPE) having a thickness of 175µ is in contact with a polyethylene extrusion layer of low density polyethylene (LDPE) having a thickness of 30µ. The polyethylene extrusion layer binds to a primer layer of polyethylene imines (PEI) having a thickness of 0.1µ. The primer layer is in contact with a core layer of printed polyester film of polyethylene terephthalate having a thickness of 12µ. The core layer of printed polyester film is in contact with another primer layer of polyethylene imines (PEI) having a thickness of 0.1µ. This primer layer binds with a polyethylene extrusion layer of low density polyethylene (LDPE) having a thickness of 30µ. The inner polyethylene layer of 70:30 to 30:70 of low density polyethylene (LDPE) and a linear low density polyethylene (LLDPE) having a thickness of 175µ is in contact with the above polyethylene extrusion layer.

Example 2

A polyester film based laminate is prepared in the same way as outlined in example 1, having the laminate structure:

Low density polyethylene (LDPE) and linear low density polyethylene (LLDPE) in ratio 50:50 having a thickness of 175µ//polyethylene extrusion layer of low density polyethylene (LDPE) having a thickness of 30µ//first primer layer of polyethylene imine (PEI) layer having a thickness of 0.1µ// core layer of printed polyester film of polyethylene terephthalate having a thickness of 12µ//second primer layer of polyethylene imine (PEI) having a thickness of 0.1µ// polyethylene extrusion layer of low density polyethylene (LDPE) having a thickness of 30µ//inner polyethylene layer of low density polyethylene (LDPE) and a linear low density polyethylene (LLDPE) in ratio of 50:50 having a thickness of 175µ.

Although the subject matter has been described in considerable detail with reference to certain preferred embodiments thereof, other embodiments are possible. As such, the spirit and scope of the appended claims should not be limited to the description of the preferred embodiment contained therein.

We claim:

1. A polyester film based laminate, consisting of:
    an outer polyethylene layer of 70:30 to 30:70 low density polyethylene (LDPE) and a linear low density polyethylene (LLDPE);
    a polyethylene layer of low density polyethylene (LDPE);
    a first primer layer of a polyethylene imine (PEI);
    a core layer of a printed polyester film of polyethylene terephthalate (PET) printed with an ink wherein the core layer is coated with a silane layer;
    a second primer layer of a polyethylene imine (PEI);
    a polyethylene extrusion layer of low density polyethylene (LDPE); and
    an inner polyethylene layer of 70:30 to 30:70 low density polyethylene (LDPE) and a linear low density polyethylene (LLDPE);
    wherein the ink used for the printing is vinyl ink having particle size of pigments less than 5 micron or polyurethane ink (PU).

2. The laminate as recited in claim 1, wherein said core layer of a printed polyester film is printed by reverse printing technique or surface printing technique.

3. The laminate as recited in claim 2, wherein the said reverse printing technique of the polyester film is by gravure printing technique.

4. The laminate as recited in claim 1, wherein the linear low density polyethylene (LLDPE) has a density in the range of 0.912 g/cc to 0.940 g/cc, and the density of low density polyethylene (LDPE) is in the range of 0.918 g/cc to 0.935 g/cc.

5. The laminate as recited in claim 1, wherein the said outer polyethylene layer is printed.

6. A tube or a lamitube made of the laminate as recited in claim 1.

7. A method for producing a polyester film based laminate as recited in claim 1 comprising:

(A) receiving a polyester film;
(B) coating said polyester film with a silane layer;
(C) printing a print mark on said polyester film coated with a silane layer from Step (B) using a suitable ink;
(D) coating said polyester film with a polyethylene imine primer on both sides; and
(E) performing extrusion lamination with said polyester film sandwiched between said polyethylene layers, to obtain the polyester film based laminate.

8. The method as recited in claim 7, wherein said printing is a surface printing selected from letterpress printing, flexography printing, and hologram printing.

9. The method as recited in claim 7, wherein the ink used for printing is vinyl ink having particle size of pigments less than 5 micron or polyurethane ink (PU).

10. The method as recited in claim 7, wherein said outer polyethylene layer is printed by letterpress or flexography printing process.

11. A polyester film based laminate, consisting of:
(A1) an outer polyethylene layer of 70:30 to 30:70 of low density polyethylene (LDPE) and linear low density polyethylene (LLDPE) having a thickness of 175 µm;
(A2) a polyethylene extrusion layer of low density polyethylene (LDPE) having a thickness of 30 µm;
(A3) a first primer layer of a polyethylene imine (PEI) having a thickness of 0.1 µm;
(B1) a core layer of printed polyester film, of polyethylene terephthalate having a thickness of 12 µm;
(C3) a second primer layer of a polyethylene imine (PEI) having a thickness of 0.1 µm;
(C2) a polyethylene extrusion layer of low density polyethylene (LDPE) having a thickness of 30 µm; and
(C1) an inner polyethylene layer of 70:30 to 30:70 of low density polyethylene (LDPE) and linear low density polyethylene (LLDPE) having a thickness of 175 µm.

* * * * *